Figure 1:
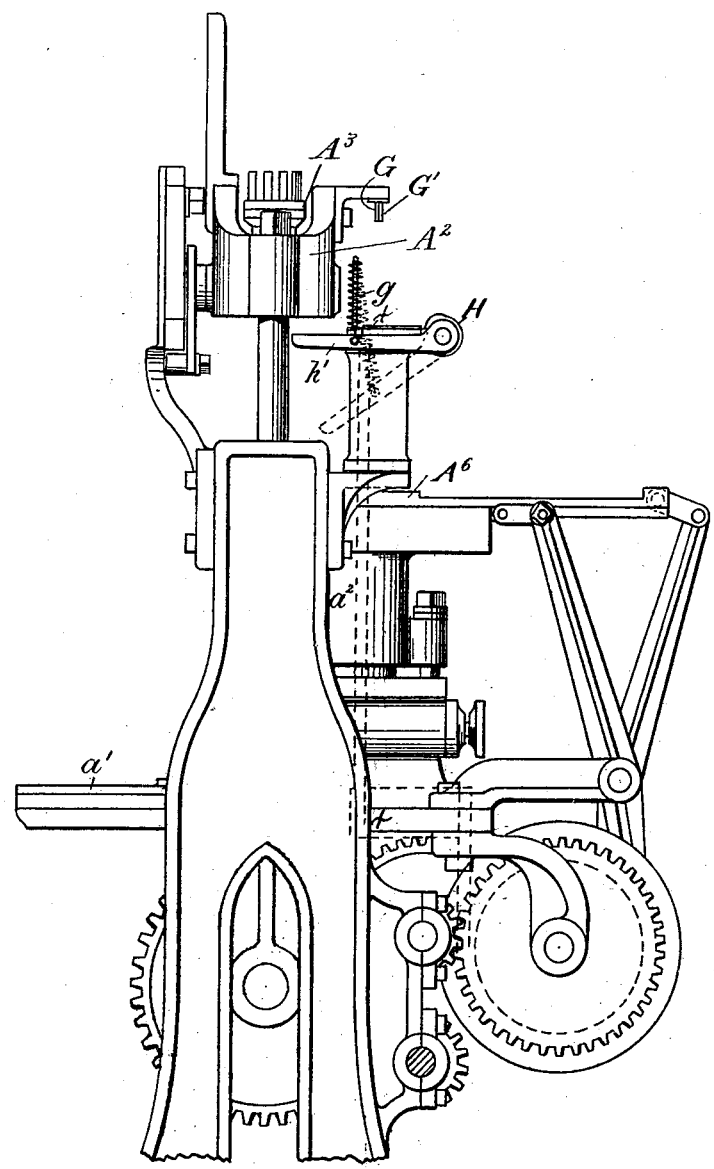

(No Model.)

F. F. RAYMOND, 2d.
HEEL NAILING MACHINE.

No. 356,553.

10 Sheets—Sheet 2.

Patented Jan. 25, 1887.

WITNESSES
J. M. Dolan,
Fred. B. Dolan.

INVENTOR
F. F. Raymond 2d

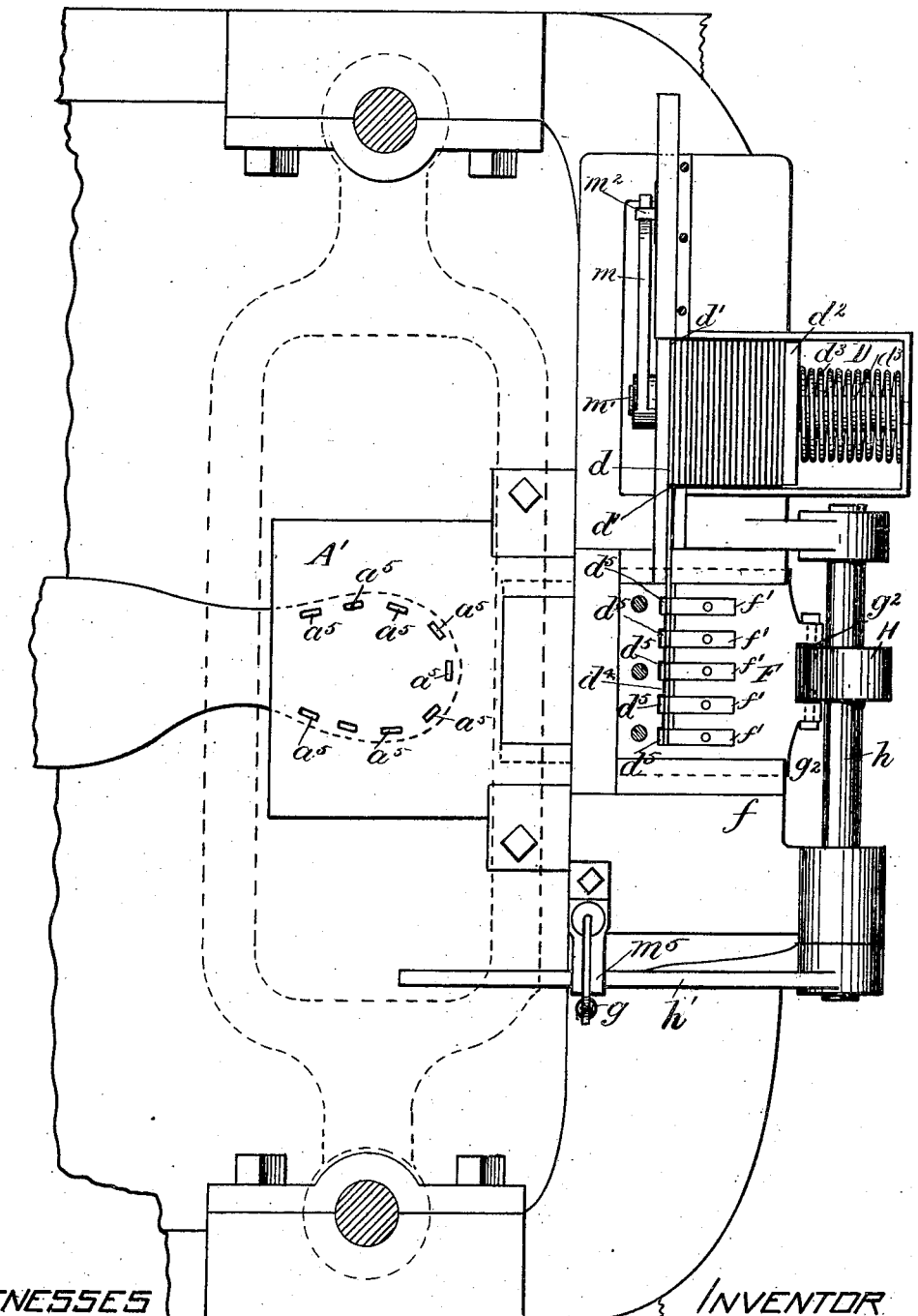

(No Model.) 10 Sheets—Sheet 6.
F. F. RAYMOND, 2d.
HEEL NAILING MACHINE.
No. 356,553. Patented Jan. 25, 1887.
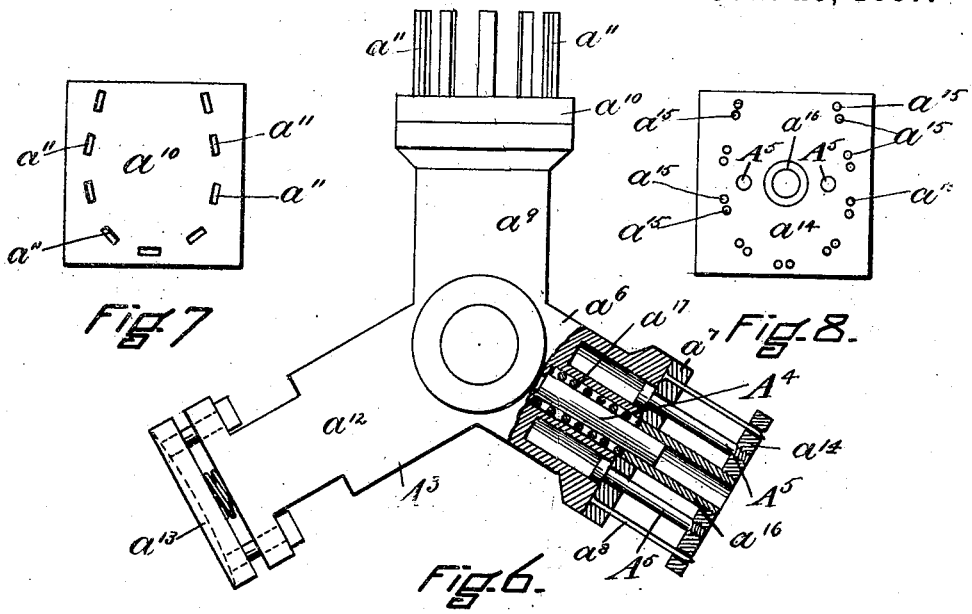
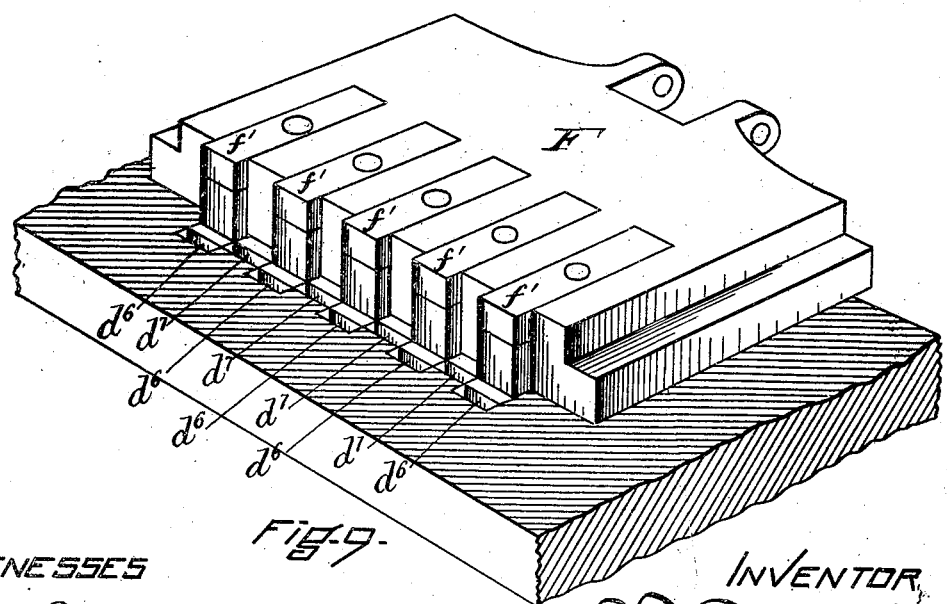
WITNESSES
INVENTOR (No Model.)  F. F. RAYMOND, 2d.  10 Sheets—Sheet 8.
HEEL NAILING MACHINE.
No. 356,553.  Patented Jan. 25, 1887.
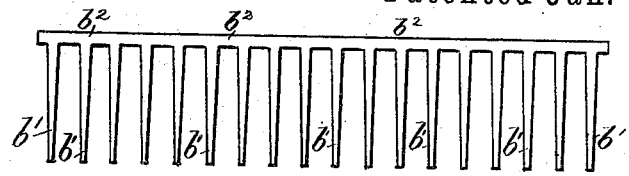
Fig. 11.
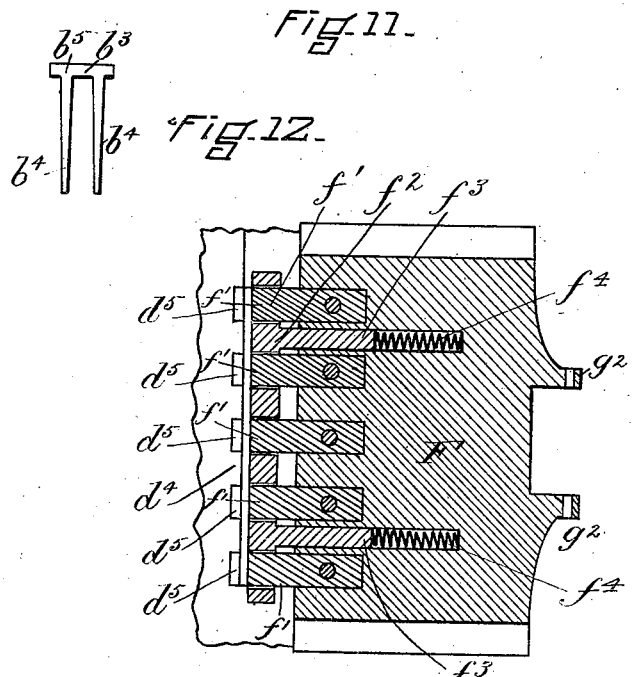
Fig. 12.
Fig. 13.
Fig. 14.
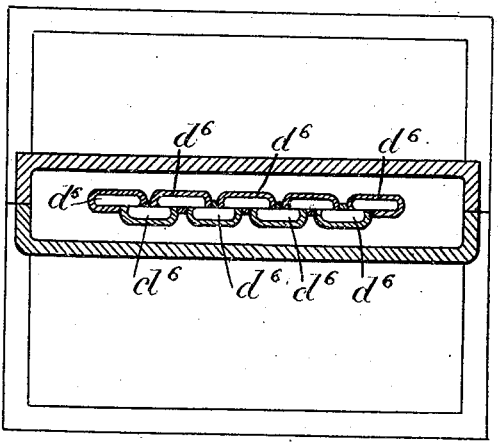
Fig. 15.
WITNESSES
J. M. Dolan.
Fred. B. Dolan.
INVENTOR
F. F. Raymond (No Model.) 10 Sheets—Sheet 9.

F. F. RAYMOND, 2d.
HEEL NAILING MACHINE.

No. 356,553. Patented Jan. 25, 1887.

WITNESSES
J. M. Dolan.
Fred. B. Dolan.

INVENTOR
F. F. Raymond 2d (No Model.) F. F. RAYMOND, 2d. 10 Sheets—Sheet 10.

HEEL NAILING MACHINE.

No. 356,553. Patented Jan. 25, 1887.

WITNESSES
J. O. Dolan
Fred. B. Dolan.

INVENTOR
F. F. Raymond 2d

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 356,553, dated January 25, 1887.

Application filed November 8, 1886. Serial No. 218,365. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature.

The invention is represented in the drawings as embodied in a machine for nailing the heel-seats of boots and shoes, and also for attaching rands to the outsoles of boots and shoes.

It comprises devices for driving staples or fastenings having two or more prongs simultaneously through the parts to be united.

It further comprises devices for making the staples or fastenings automatically, and for distributing them in order or arrangement for driving and for delivering them to the nail-driving devices.

It further relates to various features and details of construction, which will hereinafter be referred to.

Figure 2:
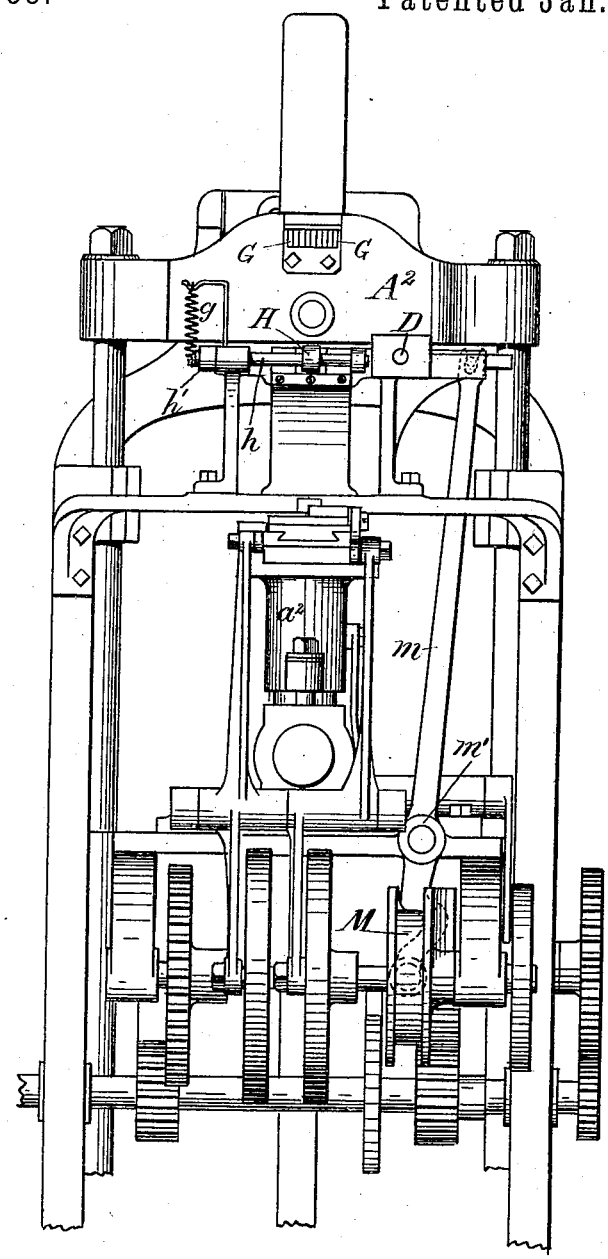
Figure 3:
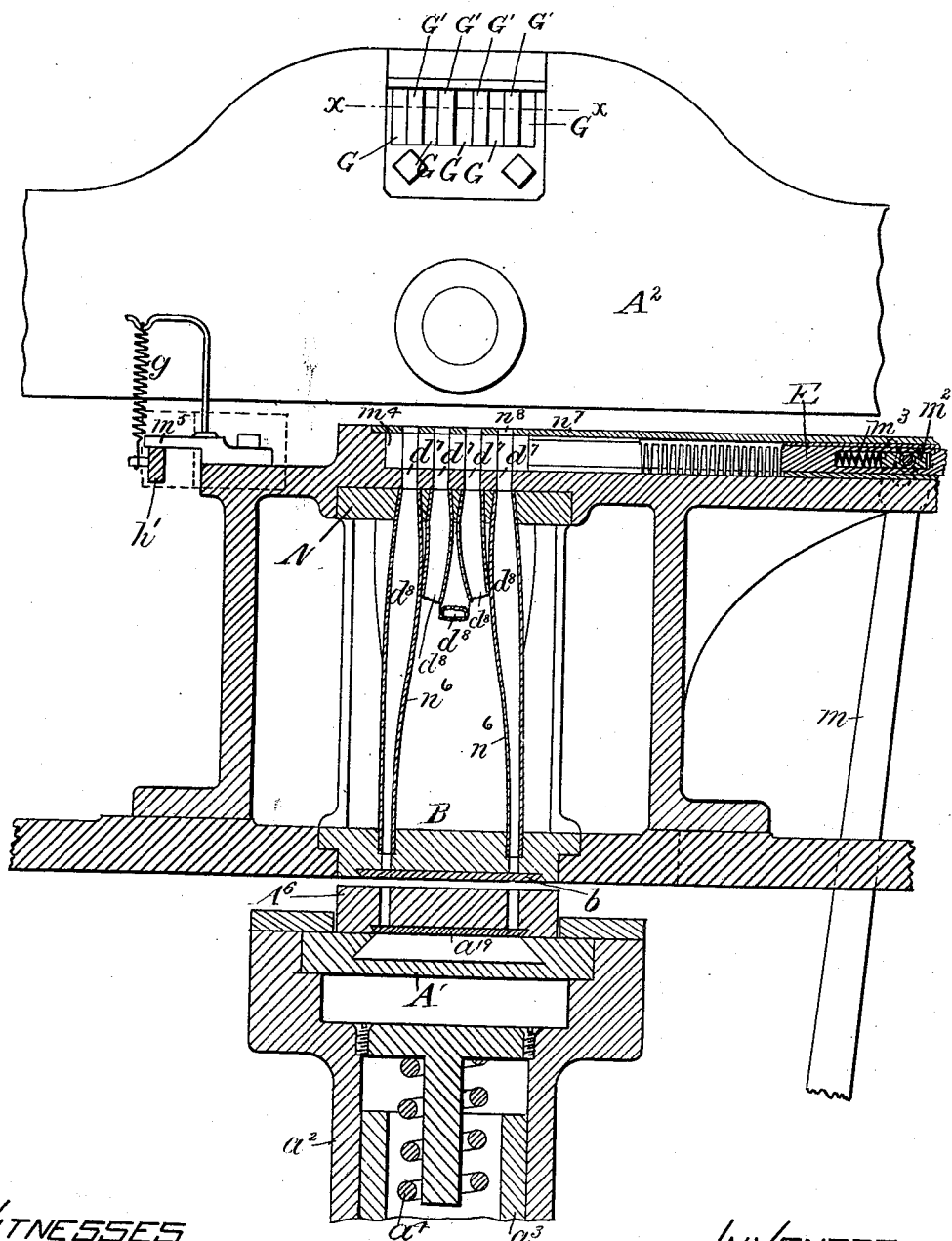
Figure 4:
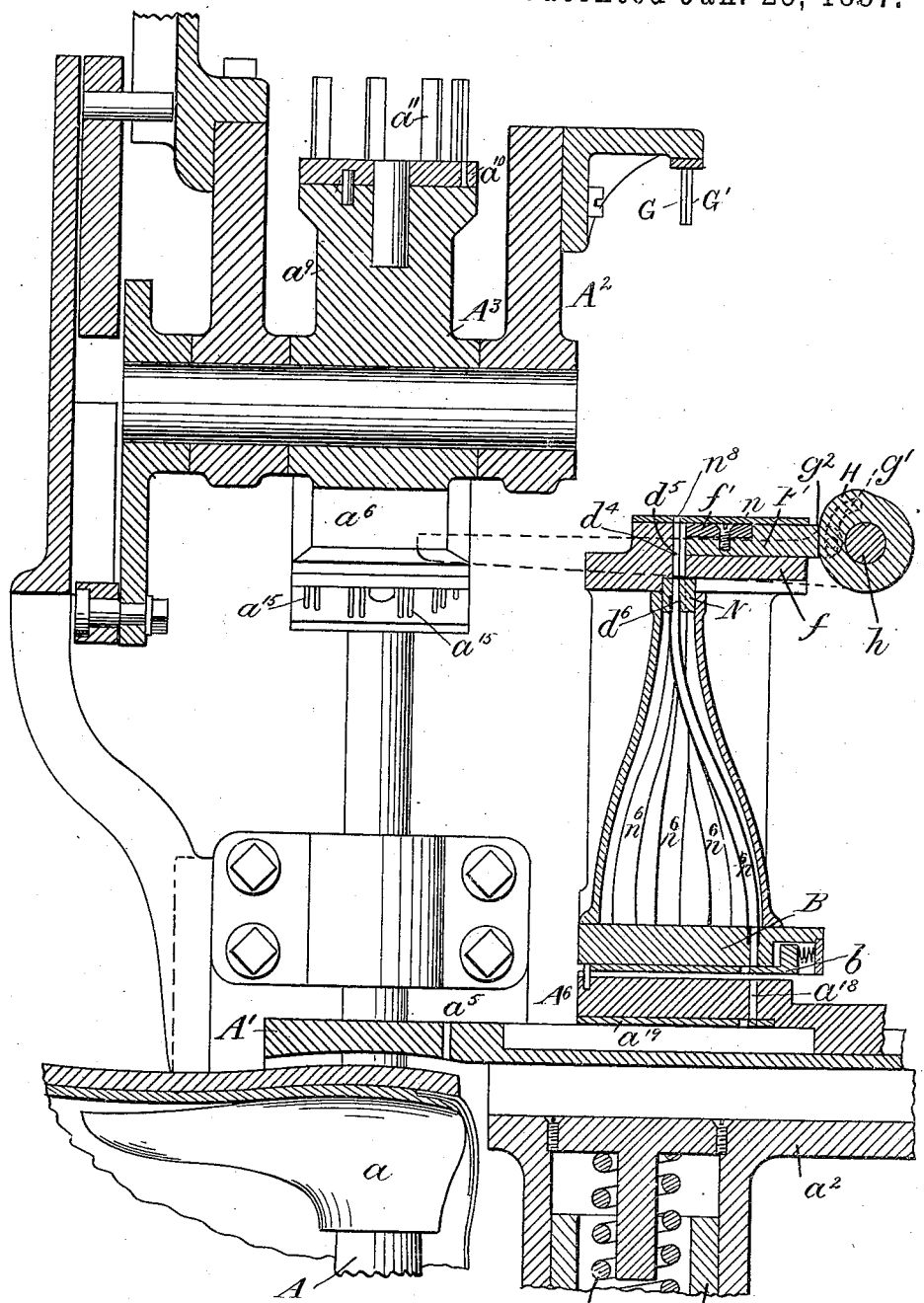
Figure 10:
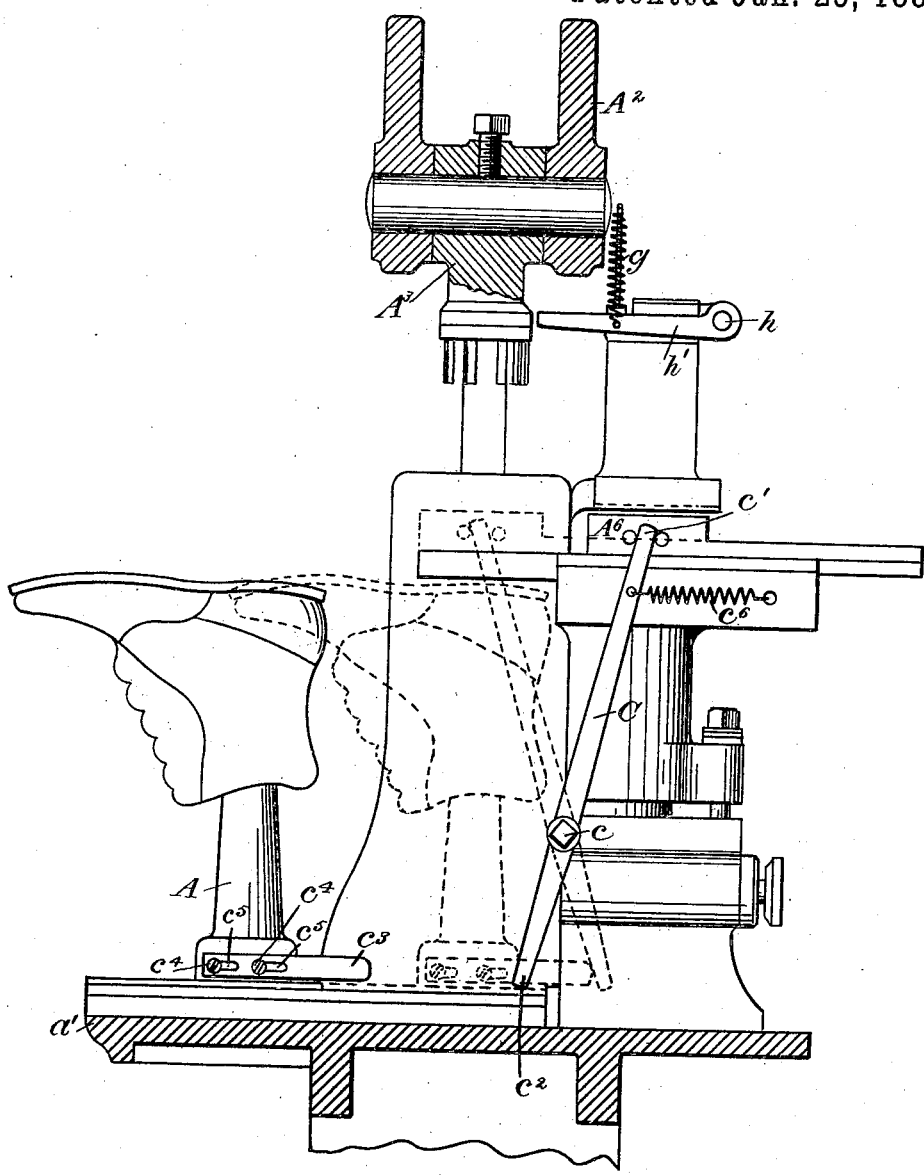
Figure 16:
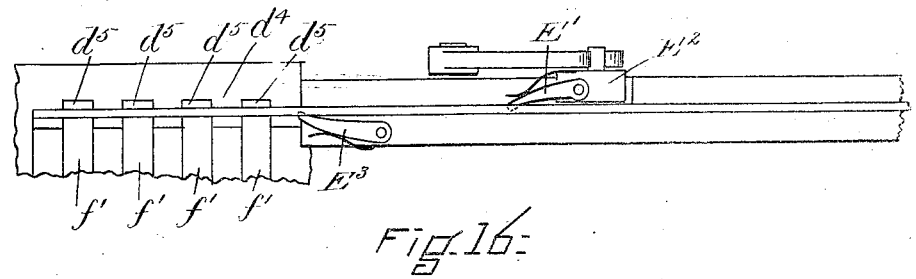
Figure 17:
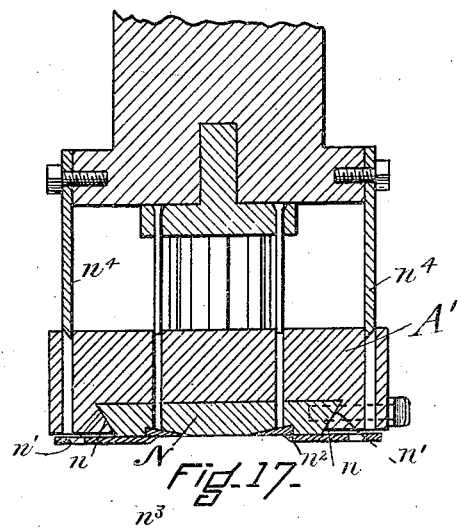
Figure 18:
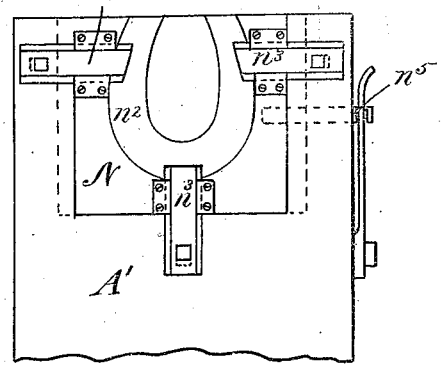
Figure 19:
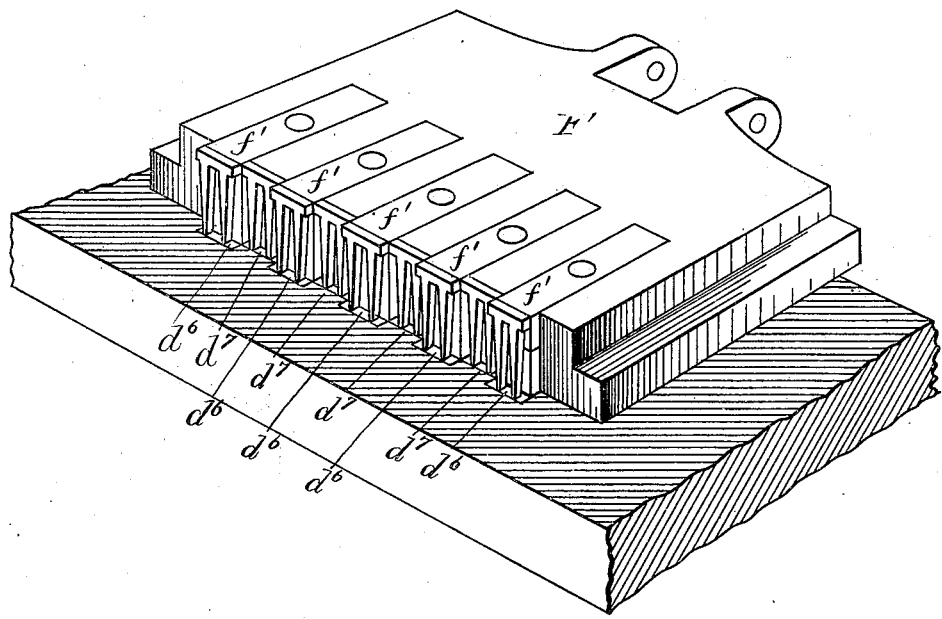
Figure 20:
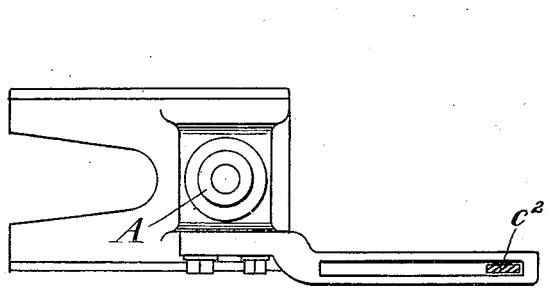
Figure 21:
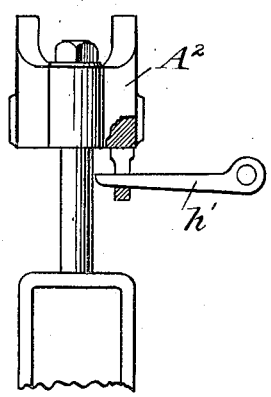

In the drawings, Figure 1 is a view in side elevation of the central and upper parts of a nailing-machine provided with my improvement. Fig. 2 is a view in rear elevation of the same sections of the machine. Fig. 3 is an enlarged view, in vertical section, upon the dotted line $x\ x$ of Fig. 1 and a view in elevation of the parts beyond said line. Fig. 4 is a view enlarged, in vertical central section, at right angles to the section shown in Fig. 3. Fig. 5 is a plan view enlarged showing the cross-head in dotted outline. Fig. 6 is a view of the revolving head removed from the cross-head, representing in section the awl-holding devices. Fig. 7 is a plan view of the block for holding the drivers. Fig. 8 is a plan view of the plate for guiding the awls. Fig. 9 is a view enlarged of the bed-plate over the staple-fastening mechanism, the block for carrying the punches or shears, and the punches or shears. Fig. 10 is a view part in vertical section and part in elevation showing the machine organized for use with drivers only. Fig. 11 is a view in elevation of a staple-forming strip. Fig. 12 is a view in elevation of a staple. Fig. 13 is a horizontal section through the punches and their holding-block, and also showing in section a yielding pressure-plate. Fig. 14 is a horizontal section upon the dotted line $x\ x$ of Fig. 3. Fig. 15 is a horizontal section across the upper part of the distributer. Fig. 16 is a detail view illustrating a modified form of staple-strip feed. Fig. 17 is a vertical section to illustrate the use of a removable rand-holding block. Fig. 18 is an inverted view of the templet-plate and removable rand-holding block. Fig. 19 is a view in perspective to show the manner of cutting the staples from the strip. Figs. 20 and 21 are detail views.

A is the jack.

$a$ is the last or work-support. The jack preferably is arranged to slide upon the bed $a'$ to present the work to the nail-driving devices.

A' is a templet. It may have a horizontal movement imparted to it by a cam and connecting mechanism, substantially as described in my Patent No. 290,109, or it may be stationary. If a spanker is not used, and it is not necessary as a rule to employ one, then it is desirable that the templet be stationary—that is, so far as having a horizontal movement is concerned. When the work is compressed by pressure from above, as it is in the machine herein described, it is necessary that the templet have a downward movement. The templet is mounted upon the table $a^2$, which has a vertical downward movement on the post $a^3$ against the pressure of the spring $a^4$. The templet also has the holes $a^5$, which are rectangular in cross-section, being very long and quite narrow.

$A^2$ is a cross-head. It is reciprocated preferably by mechanism described in the Henderson patent No. 316,894 or as described in the Raymond patent, No. 322,562. It supports the revolving head $A^3$, having an arm, $a^6$, which supports a block, $a^7$, carrying a gang or group of awls, $a^8$, another arm, $a^9$, which carries a block, $a^{10}$, supporting a gang or group of drivers, $a^{11}$, and an arm, $a^{12}$, which supports a spanker-block, $a^{13}$. The mechanism for rotating the head is shown in Patent No. 317,647. I would here say, however, that it is not usually necessary or essential to use a spanker-block, and that awls may be dispensed with in some instances, and that when they are the driver-block is attached rigidly to the cross-head. The awls, it will be observed, are arranged in gangs of two each—that is, when a staple or fastening having two prongs only is employed. This arrangement is necessary, as two awls must enter each of the long holes of the templet in order to form the holes for the prongs of the staple or fastening.

In order that the awls may be held and supported while they are entering the holes of the templet and the material, I have arranged a yielding guide-plate, $a^{14}$, having a separate guiding-hole, $a^{15}$, for each awl. This plate is held or carried at the end of a sleeve, $a^{16}$, which is supported by the awl-holding block $a^7$ and the stud $A^4$, and is movable with the plate $a^{14}$ in relation thereto against the pressure of a spring, $a^{17}$, so that upon a reciprocation of the head to drive the awls the plate $a^{14}$ comes in contact with the upper surface of the templet and remains stationary while the awls are moved downward through the holes in the templet into the work. The plate $a^{14}$ may also have the steady-pins $A^5$.

I prefer that the awls have eccentric points and long bevels upon the side toward the edge of the sole, in order that the points of the awls may be deflected inward as they are driven downward, and form holes which shall be inclined inward, in order that the prongs of the fastenings or staples may be given an inward direction as they are driven.

$A^6$ is the staple or fastening carrier. It has holes $a^{18}$, which are similar in shape and arrangement to the holes of the templet, and it has a horizontal movement upon the templet from a position under the staple or fastening holder B over the templet to carry the staples or fastenings therefrom to a position to discharge them into the holes of the templet. This carrier may be moved by a cam and connecting devices, substantially as specified in said Patent No. 290,109, or it may be moved by hand. It has a sliding perforated hole-covering plate, $a^{19}$, which has holes corresponding in size with the holes therein, and which is moved to close and open the holes, as described in said Patent No. 316,894. The staple or fastening-holder B also has a hole-covering plate, $b$, which is moved by the carrier $A^6$, and a spring to open and close the holes, as described in Patent No. 326,780.

I prefer to make the staple or fastening from a staple or fastening forming strip, substantially as represented in Fig. 11, having a series of prongs, $b'$, connected at their upper ends by the narrow margin $b^2$. This strip is separated into staples or fastenings by cutting or dividing it into separate staples or fastenings $b^3$, each having two prongs, and the fastening or staple as prepared for use is represented in Fig. 12. It will be seen that it has, in effect, the two prongs $b^4$, which preferably are pointed, and which extend from the head or connecting section $b^5$, and that this connecting-section extends beyond each end of the fastening, so as to form a head. This head-connecting portion of the staple or fastening is of the same width as the upper portion of the fastening and is quite thin.

The mechanism for forming the staples or fastenings and for delivering them to the fastening-carrier comprises a box for holding a large number of the strips side by side, which contains a spring-follower for automatically moving the strips, one by one, to a position to be engaged by a feeding device which grasps or comes in contact with each strip in order and carries it to a position in front of the punching or severing devices. These punching or severing devices are arranged to cut the strip into as many staples or fastenings as may be desired, and comprise a series of punches or shears mounted upon a common block, and movable across the feedway to horizontally cut the strip, or a part of the strip, into fastenings or staples, every other fastening or staple being moved by the punches or severing devices from the feedway into a position over the line of the receiving-holes, which conduct the fastenings or staples thus removed from the strip to the staple-holder, and while the other fastenings or staples which are formed by the act of cutting out—that is, which are thus moved by the punches or severing devices—are moved downward from the feedway into holes or passages which open therefrom, and which are adapted to receive these fastenings or staples and convey them also to the fastening or staple holder. The mechanism for providing these movements is connected with the fastening or staple driving devices, so that one full reciprocation of the cross-head serves to feed the strip for a gang or group of fastenings and deliver them into the holder in an arrangement for immediate delivery to the fastening-carrier. This organization is especially desirable when the awls or spankers are not used, or, in other words, when the drivers only are used, and the cross-head makes but one reciprocation in driving the fastenings or staples, as the act of driving the fastenings or staples also provides the fastenings or staples for the next shoe which is to be nailed, so that the operator can place the work upon the last or work-support, move it into position beneath the driving devices, and by one movement of the cross-head nail the work and at the same time provide a gang or group of fastenings or staples for the next shoe to be nailed. When the machine is thus organized, the carrier may be moved automatically, substantially as described in my Patent No. 290,109, or in any other desirable way; or it may be connected with the jack, as represented in Fig. 10, so that the movement of the jack into position shall also move the carrier into position to deliver its staples or fastenings to the templet, and the outward movement of the jack or work-support shall move the carrier backward into a position beneath the holder and to receive the fastenings. This mechanism is shown in Fig. 10, and comprises an inclined lever, C, which is pivoted at $c$, and which is connected at its upper end, $c'$, with the staple or fastening carrier, and has its lower end, $c^2$, in a position to be engaged by the projection $c^3$ upon the jack, so that upon the inward movement of the jack the lower end of the lever is moved inward and its upper end outward. This causes the carrier to be moved outward until the jack comes to rest beneath the templet and carrier.

The projection upon the jack is made adjustable horizontally by means of the screws $c^4$ and slots $c^5$, so that the extent of the throw of the carrier may be varied.

Upon the reverse movement the lever may be so connected with the jack and the carrier that its lower end is moved outwardly with the jack, and its upper end causes the carrier to be moved backward. This movement, however, can be accomplished by a spring, $c^6$, arranged to draw against the upper end of the lever, so that the connection between the lower end of the lever and the jack need not be positive.

The carrier can be moved by hand, in which case the operator, upon moving the jack into position, will move the carrier out over the templet before starting the machine, and will move it back under the holder to receive the next load of fastenings or staples upon the completion of the nailing and the removal of the work from the templet.

D is the box for holding the fastenings or staple strip. It is of the length of the strip used, and opens at its end $d$ into the feedway $d'$ of the fastening or staple making devices. The follower $d^2$ is fitted in the box to bear against the strips held therein, and is moved toward the feedway of the machine by the spring $d^3$, so as to move the strips in successive order into place to be engaged by the feed-bar E. The feedway extends from the side of the box horizontally and in front of the abutment or wall $d^4$, and this abutment or wall has the holes or openings $d^5$, which open into the delivery passages or holes $d^6$, and these passages or holes serve to convey and guide the staples or fastenings to the holder B. In front of this abutment or wall there are also openings $d^7$ to the passages $d^8$, which serve to convey and guide the fastenings or staples which remain in the feedway after the action of the punches or separating devices to the holder B. The walls of these passages are preferably formed from sheet metal of a ductile nature.

The punching or severing devices comprise a block, F, arranged to slide horizontally upon the bed $f$, and having the series of punches or shears $f'$, which are mounted upon the block so as to be moved across the feedway and into the holes or passages $d^5$ in the abutment or wall $d^4$. There may be attached to the block F a pressure-plate, $f^2$, (see Fig. 13,) which is connected therewith by pins $f^3$, and against which the springs $f^4$ bear, so that this pressure-plate extends, when the punches are back, somewhat beyond their ends, and upon the inward movement of the punch-block comes in contact with the side of the fastening-strip, and serves to press it against the abutment or wall and hold it, while the block, continuing its movement, forces the punches or shearing-blocks through the strip into the passages or holes beyond, so that the sections punched from the strip are caused to be moved into a position over the passages $d^6$. The punches or shears then become stationary, and the staples or fastenings are moved downward into their respective passages by means of strippers or plungers carried by an arm or bracket extending from the cross-head $A^2$. There are two lines of these strippers or plungers—first, the line G, which serves to move the fastenings or staples carried from the strip to a position over the passages $d^6$ into said passages, and, second, the strippers G′, which serve to remove the staples or fastenings held or remaining in the feedway into their respective passages, $d^8$; and this operation of the strippers or plungers necessitates that the block carrying the punches or shears and the pressure-plate shall be operated upon the beginning of the downward movement of the cross-head $A^2$, and this is accomplished by means of a wiper-cam, H, which is mounted upon a shaft, $h$, behind the block, and which shaft has a long arm or lever, $h'$, extending from one end to a position immediately beneath the cross-head $A^2$ when at its highest position, and the wiper-cam is so shaped that upon a partial rotation of the shaft the block is moved immediately inward, so as to cause the punches or shears to sever the strip into staples or fastenings and advance a number thereof to their delivery-passages, and to hold the block and punches in this position while the plungers or strippers, which are so placed as to then come into action, operate to move the staples or fastenings into their respective passages.

Of course the lever is moved downward during the downward movement of the cross-head; but the wiper-cam is so shaped as not to impart additional movement to the punches.

Upon the upward movement of the cross-head the punches or strippers are moved with it, and the lever $h'$ is also moved upward therewith, either being attached to the cross-head by a yoke, or having the spring $g$ for the same purpose, and the block is moved outward with its punches by means of a spring or cam-grooves $g'$ in the wiper-arm and the connection $g^2$.

Of course the movement of the feed must take place immediately before the upward movement of the cross-head, and this movement is produced by means of a cam, M, and lever $m$, pivoted at $m'$, the lower end of which has a cam-pin which enters the cam-groove of the cam, and the upper end of which engages the slide-bar E. The upper end of the lever, preferably, is connected with this sliding block, so as to have a yielding movement in relation thereto. (See Fig. 3.) This is provided by means of the yielding block $m^2$ in the bar E and the spring $m^3$. The feed-bar advances or moves the strip until its end comes in contact with the stop $m^4$ at the end of the feedway, and is so timed as to always move the strip into that position, the cam being timed so as to throw the end of the lever sufficiently to accomplish this result, and the spring taking up the additional movement of the lever at the end of the throw. The feed-cam is so shaped as to move the feed-block outward or into position to engage the strip during the downward movement of the cross-head.

It will be seen that the holes or passages in the wall or abutment are, in effect, dies, and that each vertical edge thereof forms a cutting-edge in connection with the punches or shears $f'$. Of course the passages connecting the feedway and dies with the fastening-holder may have any form or arrangement desired.

In lieu of forming the staple or fastening with two prongs, it may have three or more prongs, if desired, and the only difference in the organization of the machine would be that required for working fastenings of this length rather than shorter ones; or this result would be attained if the strip had three or more prongs in the space formerly occupied by two.

I have represented the device as adapted for nailing heel-seats and for attaching rands thereto. I would say that I do not limit it to this especial use, for it may be employed in nailing soles generally, in attaching welts to uppers and insoles or to outsoles, for attaching heels, and also for other purposes and uses where it is desired to drive a gang or group of fastenings. each of which has two or more prongs.

The drivers are made of a size sufficiently large to include, substantially, the entire upper surface of the fastening or staple.

In operation, the operator places the boot or shoe upon the last or work-support and moves it into position beneath the nailing devices, and if a rand is to be attached he places the rand upon the outsole. The templet-plate is then moved down upon the work, and if awls are used the awls are reciprocated. This reciprocation of the head also forms a gang or group of fastenings or staples, which fall to the holder. A gang or group previously made having been delivered to the carrier, which is then moved into position over the templet, the drivers are then brought into position and reciprocated and the fastenings driven into and through the work. The templet and carrier plates are then withdrawn and the spanker operated. When the machine is thus operated—that is, when the cross-head makes three reciprocations—the cam for operating the fastening or staple strip feed, instead of being on the crank-shaft of the machine, must be on a counter-shaft connected therewith to make one revolution for every three of the crank-shaft, so that although the punches or plungers are moved by each reciprocation of the cross-head, the tack-strip is fed only once during three reciprocations of the cross-head.

For ordinary uses it will not be necessary to use the awls or spanker, and in that event the operator moves the work into position, and the movement of the jack moves the fastening-carrier into place over the templet, or it is moved automatically or by hand, as above specified. The cross-head is then reciprocated and the gang of fastenings or staples simultaneously driven, and at the same time a gang or group of staples or fastenings for the next shoe in order is made and delivered to the holder. The operator then moves the jack or last outward, and the carrier, if not already moved backward automatically, is returned to a position to receive the last gang or group of fastenings made, so that it stands ready loaded to deliver fastenings to the next shoe in order.

The work is, of course, compressed before or during the driving of the fastenings—before, if the awls are employed, and during the driving if drivers only are used—the lower surface of the awl-block or driver-block coming in contact with the upper surface of the templet or nail carrier and moving the templet or templet and nail carrier downward with sufficient force to solidify the seat very considerably. This enables the nailing of heel-seats and of rands not only to be rapidly done, but also to be better done than it is by hand, first, because the work is solidly compressed during the nailing operation; second, because the fastenings are placed close to the edge of the heel-seat, and, third, because of the form of the fastening employed, which, being in the form of a staple, binds or unites the parts very solidly together and in a permanent manner.

The prongs of the staples or fastenings are of such length that their ends reach and are upset upon the upper surface of the last or work-support.

The templet may have a rand-holding cavity such as is described in my Patent No. 340,239, and it may otherwise be shaped so as to mold the heel-seat to form during the nailing operation.

When long staple-strips are used, the strip-feeding mechanism preferably consists in a spring-pawl, E', (see Fig. 16,) carried by a bar or block, $E^2$, similar to the feed-bar E, the only difference being that it is carried parallel with the feedway, so as to permit the pawl to engage the shanks of the strip in feeding it into position in front of the punches or severing devices. In other respects the feed is like that above described. This construction is represented in Fig. 16, and when it is employed a detent-pawl, $E^3$, for closing behind the shanks of the strip, may be used for holding the strip during the return or backward movement of the feed-pawl preparatory to again engaging the strip. When rands are to be attached, I prefer to make the templet-block in two parts, and to make the under part easily movable, in order that it may be readily taken out, a rand fitted in its rand-holding recess, and replaced. This construction I have represented in Figs. 17 and 18, where N is the removable part of the templet-block. It is represented as provided with dovetail or inclined sides $n$, which fit dovetail ways $n'$ of the templet-plate, and as having a welt-holding cavity or recess, $n^2$, provided with slides $n^3$ for holding the welt therein, which slides are automatically moved outward to release the welt by the rods $n^4$, attached to the arm carrying the drivers, or to the driver-holder block, and which are adapted to operate substantially as described in my Patent No. 342,039. The removable block is adapted to be slid into place and locked by a spring-pin, $n^5$. Of course the entire templet-block may be made removable from the end of the plate carrying it, in lieu of making the section removable; but I consider the latter the preferable construction. This removable block may be made of metal more easily worked than iron—such as brass or other suitable composition, for instance—and a number of them may be used with the same templet, so that, if desired, a boy may be placing the rands in their rand-holding recesses for the use of the operator. The operator would then simply remove the block, in that instance, and substitute another block having a rand therefor.

For nailing heel-seats without a rand, it is desirable that the templet be provided with a cavity, substantially as shown in Fig. 4, so that it may act to shape the outsole to the upper and insole by pressure, and hold them compressed upon the last or work-support while the staples or fastenings are being driven.

When a rand is attached, of course the form of the recess or cavity is changed to receive it and form it upon the outsole and at the same time press the rand, outsole, upper, and insole upon the last or work-support to any desired form or configuration.

It will be seen that the stop $m^5$, Fig. 3, limits the extent of the upward movement of the lever $h'$. I would say, also, that fastenings may be punched from the strip upon the upward movement of the cross-head, instead of the downward movement, if desired, and when they are so punched the group then made can be driven into the next shoe in order. This would necessitate that the plungers G G' be moved downward upon the upward movement of the cross-head.

The distributer, it will be seen, comprises, in substance, the plate N', which has two lines of holes corresponding to the holes or passages $d^6$ $d^7$, which holes form, in fact, continuations of the passages $d^6$ $d^7$, and into these holes are inserted the ends of the tubes $n^6$, which make the continuations of the passages $d^6$ $d^7$, and which act as guides in turning the fastenings and arranging them in the block B for driving them.

I prefer to use tubes for forming the passages, as they are inexpensive and can be easily shaped to the desired form. Of course they may connect directly with the holes of the templet, as described in my Patent No. 346,607, if desired. I also prefer to use a cap-plate, $n^7$, having holes $n^8$, to receive and hold the plungers G G' during their downward movement and while forcing the staples from the die-recesses in the feedway into the passages. Of course the passages must be made wider below the feedway to permit the free movement or the dropping of the staples from the position to which they are moved by the plungers through the tubes.

Having thus fully described my invention, I claim and desire to secure by Letters Patent of the United States—

1. The combination of the templet A', having the wide holes $a^5$, with the last or work-support $a$, and the reciprocating head A², and the awls $a^8$, arranged in groups of two, their holding-block $a^7$, and the yielding centering and holding plate $a^{14}$, substantially as described.

2. The combination of the head A², the block $a^7$, awls $a^8$ carried thereby, the plate $a^{14}$, having the holes $a^{15}$, the sleeve $a^{16}$, stud A⁴, spring $a^{17}$, and steady-pins A⁵, substantially as described.

3. In a staple making and driving machine, a magazine for holding staple-forming strips, and mechanism, substantially as described, for feeding them therefrom, strip by strip, a feeding device for advancing the strips in successive order to a gang of punches or severing devices, whereby a number of independent or separate staples are simultaneously made, substantially as described.

4. In a staple making and driving machine, a magazine for holding staple-forming strips, and mechanism for feeding them therefrom, strip by strip, a feeding device for advancing the strips in successive order to a gang of punches or severing devices, and the abutment $d^4$, having the dies or recesses $d^5$, passages $d^6$, extending therefrom, and the passages $d^7$, extending from the feedway, substantially as described.

5. The combination of the cross-head carrying a gang or group of drivers with the bed $f$, the slide block F, punches $f'$ carried thereby, the feedway $d'$, the abutment or block $d^4$, having the die-recesses $d^5$, and mechanism connecting the slide block F with the cross-head A², whereby upon the movement of the cross-head in one direction the punches are caused to be moved across the feedway, substantially as described.

6. The combination of a reciprocating cross-head, A², of a fastening-driving machine with the bed $f$ and block F, carrying one or more punches or severing devices, a block, $d^4$, having one or more die-recesses, $d^5$, mechanism, substantially as specified, connecting the slide-block F with the cross head, the feedway $d'$, and a strip-feeding mechanism, substantially as described.

7. The combination of the cross-head of a fastening-driving machine, the block F, mounted upon the bed $f$, carrying one or more punches, and an actuating device connecting it with the said cross-head, whereby upon the movement of the cross-head in one direction the block is caused to be moved in one direction, and upon a reverse movement of the cross-head it is permitted or caused to be moved in a reverse direction, substantially as described.

8. In a machine for making and driving gangs or groups of staples, the slide-block F, mounted upon the bed $f$, a gang or group of punches or severing devices carried thereby, and a cam, H, for moving said slide-block F, substantially as described.

9. The combination, in a fastening-driving machine, of the slide-block F, mounted upon the bed $f$ and carrying a gang or group of punches or severing devices, the cam H, for operating the same, its shaft $h$, and lever $h'$, substantially as described.

10. The combination, in a fastening-driving machine, of the slide-block F, mounted upon the bed $f$ and carrying a gang or group of punches or severing devices, the cam H, for operating the same, its shaft $h$, lever $h'$, and spring $g$, substantially as described.

11. The combination, in a fastening-driving machine, of a reciprocating cross head, the fastening-driving devices carried thereby, a gang or group of fastening-making devices carried by a slide-head, and intermediate connecting devices, substantially as specified, connecting the slide-head with the cross-head, whereby upon the movement of the cross-head in one direction the slide-head is caused to be moved to form a gang or group of fastenings, substantially as described.

12. The combination, in a fastening-driving machine, of a cross-head carrying the driving devices, mechanism, substantially as specified, for automatically forming a gang or group of fastenings, devices connecting the said mechanism with the said cross-head, a distributer for receiving the fastenings and holding the same, and a carrier for transferring the fastenings from the distributer to the nail-driving devices, substantially as described.

13. The combination, in a fastening-driving machine, of the cross-head carrying driving devices, two gangs or groups, G G', of plungers, with a gang or group of punches or severing devices, the die-block $d^4$ and its dies $d^5$, and the passages $d^6$ $d^7$, substantially as described.

14. The combination of the slide-block F, a gang of punches carried thereby, a die-block, $d^4$, having the dies $d^5$, the two lines of passages $d^6$ $d^7$, and two groups, G G', of reciprocating plungers adapted to move the fastenings from the feedway and dies into the passages leading therefrom, substantially as described.

15. The combination of the feedway $d'$, the magazine D opening into the same and arranged to hold strips side by side, with the follower $d^2$, substantially as described.

16. The combination of the feedway $d'$, the magazine D, the follower $d^2$, the feed-block E, its operating-cam M, and connecting-lever $m$, substantially as described.

17. The combination of the magazine for holding a number of strips in order for successive delivery to the feedway $d$, the said feedway, a feed-block, E, the die-block $e^4$, arranged upon one side of the feedway, having die-recesses $d^5$, a slide block or head, F, and carrying a gang or group of punches, and the passages $d^6$ $d^7$, substantially as described.

18. The combination of the feedway $d'$, having the stop $m^4$, with the feed-block E, having a yielding connection with the end of its operating lever or arm $m$, with said lever or arm $m$, substantially as described.

19. The combination of the feedway $d'$, the die-block $d^4$, having the die-recesses $d^5$, the slide head or block F, the gang of punches carried thereby, a yielding pressure-plate, $f^2$, carried by said head or block, and passages $d^6$ $d^7$, substantially as described.

20. The combination, in a fastening making and driving machine, of devices for forming from a nail-strip a gang or group of separate fastenings, comprising a gang of reciprocating punches, substantially as described, a die-block having dies or recesses into which sections of the strip are forced by the punches, and the feedway of the machine, substantially as described.

21. The combination, in a fastening making and driving machine, of devices for forming from a nail-strip a gang or group of separate fastenings, comprising a gang of reciprocating punches, a die-block having dies or recesses into which sections of the strip are forced by the punches, the feedway of the machine, and a set of conducting-passages opening from the dies or recesses, arranged to receive fastenings therefrom and to conduct them, and another gang or group of passages extending from the feedway and arranged to receive fastenings from it and conduct them, substantially as described.

22. The combination of the movable jack A with the fastening-carrier $A^6$, and mechanism, substantially as described, connecting it with the jack, whereby upon the inward movement of the jack to move the work into operative position the carrier is also caused to be moved into position to deliver its fastenings to the driving devices, substantially as described.

23. The combination of the jack A, the fastening-carrier $A^6$, and the connecting-lever C, substantially as described.

24. The combination of the movable jack A, the adjustable block $c^3$, the lever C, and the fastening-carrier $A^6$, substantially as described.

25. The combination of the fastening-carrier $A^6$, adapted to be moved horizontally upon a suitable support, with said support, and a lever, C, connected at one end with the said fastening-carrier $A^6$, and adapted to be moved by its other end in sliding the fastening-carrier upon its support, substantially as described.

26. The combination of a sliding fastening-carrier, $A^6$, its support, the lever C, connected at one end with the fastening-carrier, and a spring, $c^8$, connected with the lever and adapted to draw the lever and fastening carrier $A^6$ out of operative position with the driving devices, substantially as described.

27. The combination of the templet plate or block with the removable welt-holding block N, substantially as described.

28. The templet-block having a recess or holding device for holding a removable rand-holding block, with said rand-holding block, and a lock for locking it to the templet, substantially as described.

29. The removable rand-holding block having a rand-holding recess, $n^2$, and rand-holding slides $n^3$, substantially as described.

30. The distributer-passages $d^6$ $d^7$, arranged at their upper ends upon parallel lines, the holes of one line being intermediate the holes of the other, as and for the purposes described.

31. The combination of the block N′, having the two lines of holes $d^6$ $d^8$, the tubes $n^6$, forming the passages $d^6$ $d^8$, and the holding-block B, substantially as described.

32. The combination, in a machine for driving staples or similar fastenings as a group or gang, of driving devices and staple-making mechanism, and a staple-delivery device for transferring the staples as a gang or group from the making devices to the driving devices, substantially as described.

FREEBORN F. RAYMOND, 2D.

Witnesses:
J. M. DOLAN,
ARTHUR W. CROSSLEY.